United States Patent [19]

Holzgrafe

[11] 4,337,419

[45] Jun. 29, 1982

[54] ANALOG GEOMETRY CORRECTOR FOR TELEVISION CAMERA IMAGE TUBES

[75] Inventor: James R. Holzgrafe, Sunnyvale, Calif.

[73] Assignee: Ampex Corporation, Redwood City, Calif.

[21] Appl. No.: 136,230

[22] Filed: Apr. 1, 1980

[51] Int. Cl.$^3$ ............................................. H01J 29/70
[52] U.S. Cl. ................................................... 315/371
[58] Field of Search ......................................... 315/371

[56] References Cited

U.S. PATENT DOCUMENTS 3,796,911  3/1974  Ensor et al. .......................... 315/371
4,132,927  1/1979  Balaban et al. ...................... 315/371

Primary Examiner—Malcolm F. Hubler
Attorney, Agent, or Firm—George B. Almeida; Joel D. Talcott

[57] ABSTRACT

A vertical-rate sawtooth waveform amplitude modulates a train of horizontal-rate pulses. Positive and negative pulse clippers receive the pulse train. One generates a clipped waveform during the last half and a zero output for the first half, of a television field. The other generates a clipped waveform during the first half and a zero output the last half of the field. A pair of AC coupled integrators, driven by respective clipped waveforms, generate horizontal-rate sawtooths which are linearly modulated, one from a maximum at the beginning of the field to zero at the center thereof, and one from zero at the center to a maximum at the end of the field. Two pairs of clippers separate the two sawtooths into four half-sawtooths, wherein each is active in a time interval corresponding to respective quadrants of the picture raster. Potentiometers are used to vary the respective waveforms to allow independent correction of the scan in any corner.

10 Claims, 4 Drawing Figures

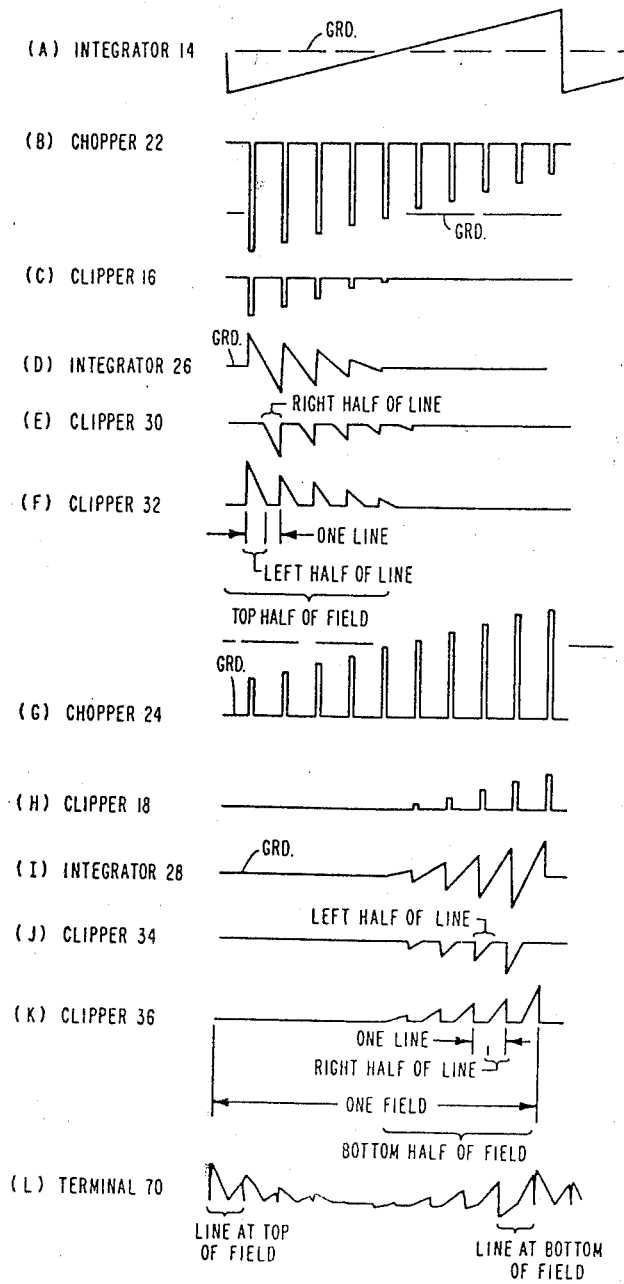
FIG_2

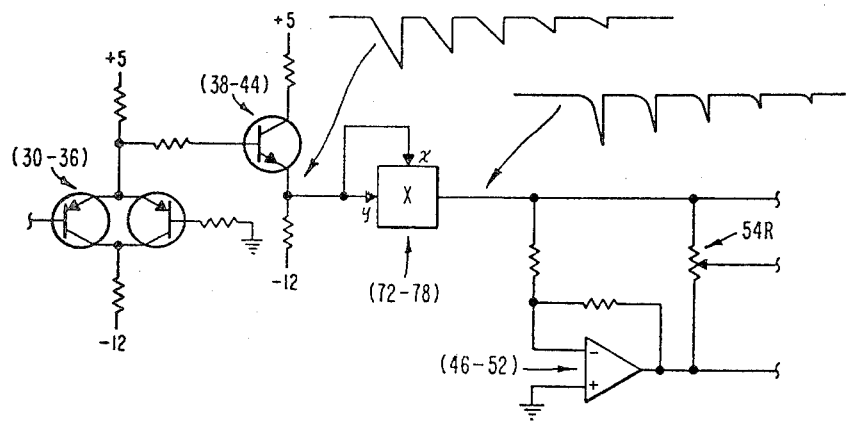
FIG_3
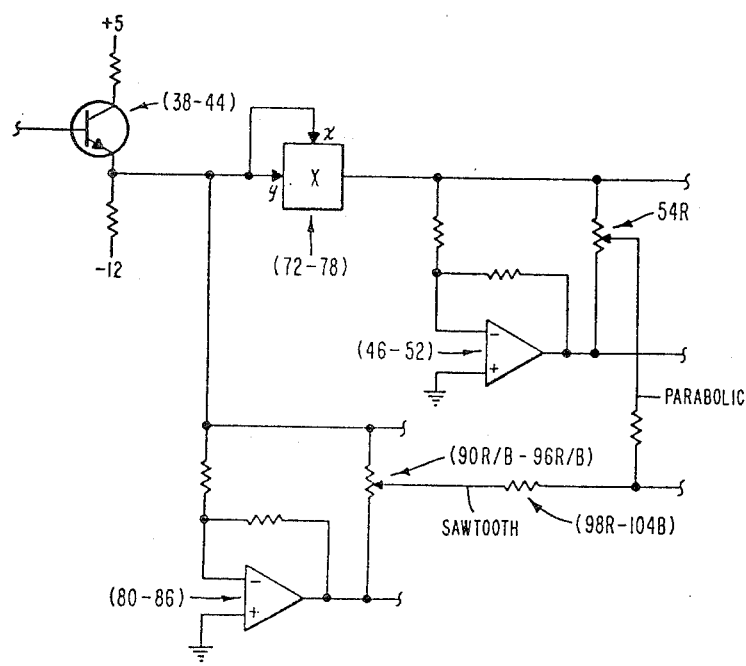
FIG_4

4,337,419

ANALOG GEOMETRY CORRECTOR FOR TELEVISION CAMERA IMAGE TUBES

BACKGROUND OF THE INVENTION

The invention relates to spatial error corrector circuits, and particularly to an analog error corrector for independently correcting geometrical scan errors in the four corners of camera tube rasters.

Typical prior art systems for the analog correction of geometrical scan errors, generally provide means for generating a fixed, full-field waveform (horizontal sawtooth modulated by vertical sawtooth and/or horizontal parabola modulated by vertical parabola) by any of several means, and for applying a portion of it to each channel. This gives rise to corrections generally referred to as "keystone" and "pincushion", respectively. The two major shortcomings of this method are; first, since the correction waveform is fixed for the full field, a correction applied to one corner of the raster will of necessity affect the other three corners a like amount in a different direction, making adjustment very difficult; second, inherently, this method can only correct symmetrical (or antisymmetrical) errors, whereas actual errors are generally non-symmetrical. Attempts have been made to provide a circuit which generates such a full-field waveform and subsequently separates the four corner quadrant signals by a gating circuit. The circuit produces the desired corner-to-corner independence but unavoidable transients and offsets in the gating process seriously degraded the resultant picture and thus such a circuit was not developed.

SUMMARY OF THE INVENTION

The invention overcomes the shortcomings of the prior art correction systems of previous mention, by providing a simple and inexpensive analog corrector circuit which is capable of independently correcting geometric errors such as horizontal and vertical keystone, pincushion, etc, in each of the four corners of a television scan raster.

To this end, vertical (V) drive pulses are integrated to generate a sawtooth waveform. Horizontal (H) drive pulses drive opposing choppers which generate two V sawtooth-modulated H pulse trains. A pair of clippers, one positive and one negative, receive respective pulse trains. One generates a zero output during the first half of a television field, and the other for the second half of the field. The clippers drive AC-coupled intergrators, which generate H-rate sawtooth waveforms modulated by the repetive first (top) and second (bottom) halves respectively, of the V sawtooth waveforms. Thus one waveform is modulated from a maximum at the beginning to zero at the center of a field, and the second is modulated from zero at the center to a maximum at the end of the field. Two pairs of clippers divide each of the H-rate sawtooth waveforms into halves to provide four output waveforms which are active in a time interval corresponding to the four quadrants of the television raster; ie, the upper left corner, upper right corner, lower left corner and lower right corner. Potentiometers in each waveform path allow selection of any positive or negative proportion of respective waveforms, and corresponding correction of geometric errors.

It is an object of the invention to provide a simple, inexpensive, analog geometry corrector circuit for the horizontal and vertical correction of scanning errors in the corners of a television raster.

It is another object to provide a circuit which generates waveforms which, when selectively added to the basic deflection waveforms in a television camera, provide independent adjustment and correction of the geometric errors in individual corners of the raster.

Another object is to provide an analog geometry corrector for correcting horizontal and vertical keystone, pincushion, etc, errors, which is inherently free from transients and picture-degrading offsets.

A still further object is to provide an error corrector which generates a parabolic, as well as a linear, approximation to the desired corner correction waveform.

BRIEF DESCRIPTION OF THE DRAWINGS

FIG. 2A–2L is a graph depicting the waveforms generated at various points of the circuit of FIG. 1.

FIGS. 3 and 4 are schematic diagrams of alternative embodiments of the invention combination.

DESCRIPTION OF THE PREFERRED EMBODIMENTS

Figure 1:
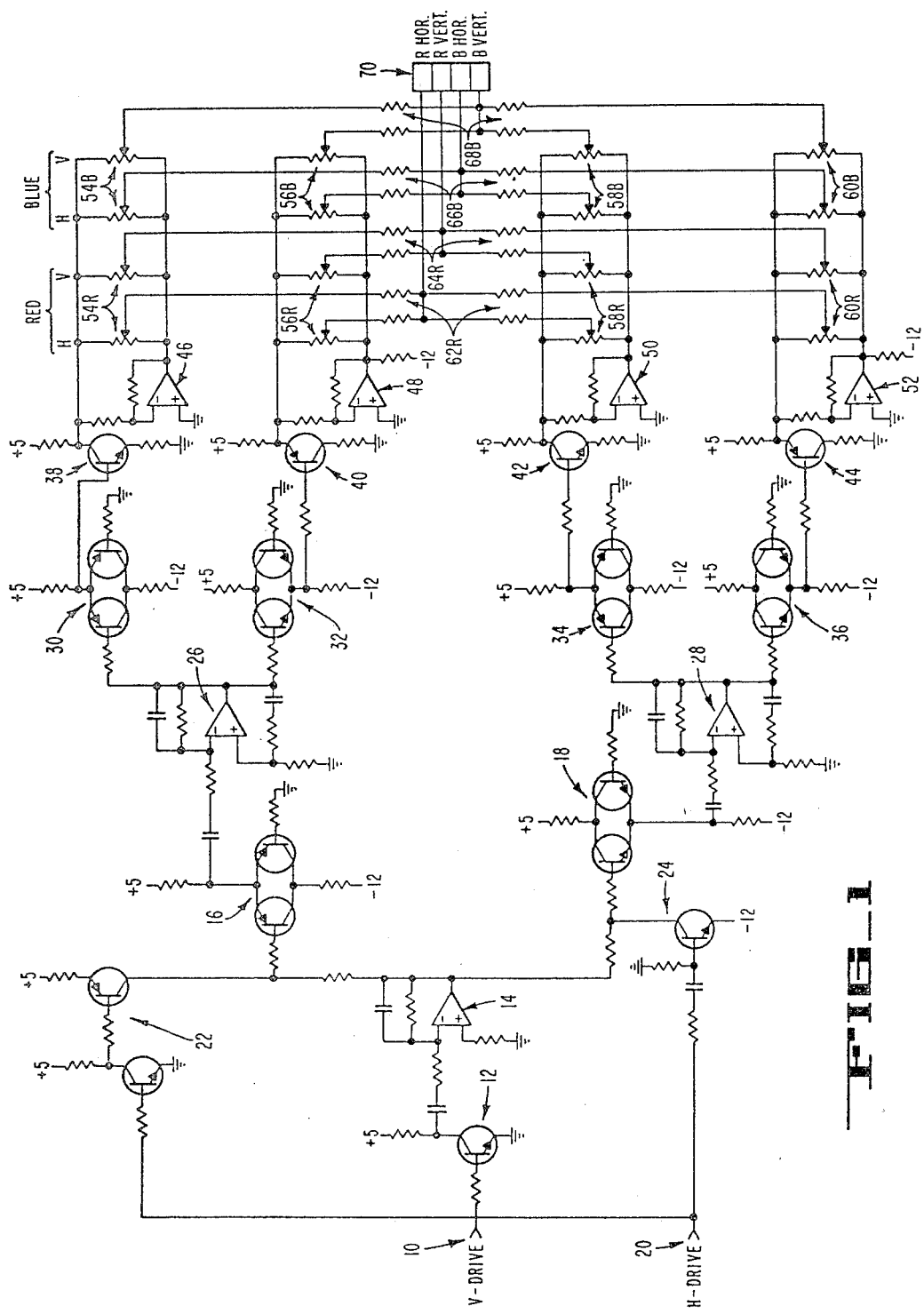
FIG. 1 is a schematic diagram depicting an implementation of the invention combination.

In FIG. 1, vertical (V) drive pulses of the camera system are applied to an input 10, and thence are buffered by a buffer transistor 12. The latter is AC-coupled to an intergrator 14, which generates a V-rate sawtooth waveform (FIG. 2A) which is fed to a negative and a positive clipper 16, 18 respectively. (Note in FIG. 2, that the waveforms of FIG. 2B through 2F relate to the top half of a television field, while 2G through 2K relate to the bottom half thereof. Further, the line and field periods of FIG. 2 are not shown in relative scale.) Horizontal (H) drive pulses of the camera system are applied to an input 20, and thence drive opposing choppers 22, 24. The latter each are coupled to the output of the integrator 14 and thus each generate a V sawtooth-modulated H pulse train. Chopper 22 applies the V sawtooth-modulated H pulse train of FIG. 2B to the clipper 16, and chopper 24 applies the V sawtooth-modulated H pulse train of FIG. 2G to the clipper 18. The clippers 16, 18 are each formed of a matched pair of transistors, whereby the incoming pulse trains are very accurately clipped at ground, as shown by the FIG. 2C and 2H, respectively. The clippers are AC-coupled to respective integrators 26, 28 to remove a DC component in the clipped pulse trains which is caused by the clipper base-emitter voltage. The integrators 26, 28 generate H-rate sawtooth waveforms modulated by the first (ie, the top) half and the second (ie, the bottom) half respectively, of the V-sawtooth waveforms. The H-rate sawtooth waveforms of integrators 26, 28 are shown in FIG. 2D, 2I respectively. Thus the waveform of FIG. 2D is linearly modulated from a maximum at the beginning of the television field to zero at the center of the field. Waveform FIG. 2I is linearly modulated from zero at the center of the field to a maximum at the end of the field. Thus each integrator's output is zero during the time interval that the other's is active.

Integrators 26, 28 are each coupled to respective pairs of clippers 30, 32 and 34, 36 respectively, which clip the respective H-rate sawtooth waveforms in the manner performed by the clippers 16, 18. Clippers 30, 32 and 34, 36 divide each waveform into halves, to define the resulting output waveforms of FIG. 2E, 2F and FIG. 2J, 2K respectively. The four waveforms correspond to the upper right, upper left, lower left and lower right quadrants of the scan raster respectively.

The clippers 30-36 are coupled to emitter-followers 38, 40, 42, 44 respectively, which cancel the base-emitter voltage offsets of the clippers which drive them. Inverters 46, 48, 50 and 52 are coupled to respective emitter-followers and provide output waveforms of opposite polarity, whereby potentiometers 54R/B, 56R/B 58R/B and 60R/B coupled to respective inverters, can select any proportion, positive or negative, of their respective incoming waveforms. The potentiometers 54R-60R correspond to the red (R) channel scan corrections, while the potentiometers 54B-60B correspond to the blue (B) channel scan corrections.

Summing resistors 62R, 64R, 66B and 68B are coupled to selected potentiometers as shown in the FIGURE, and sum the outputs of the four quadrant signals into full composite waveforms which are to be applied to the red and blue, horizontal and vertical deflection drives (not shown) of a color television camera via output terminals 70. Thus, summing resistors 62R provide the composite waveform to the R horizontal driver, resistors 64R supply the R vertical driver, resistors 66B supply the B horizontal driver, and resistors 68B supply the B vertical driver, all via the output terminals 70. A typical full composite driving waveform is shown at FIG. 2L.

Thus, adjustment of the appropriate potentiometer causes the correction of a respective corner of the red and/or blue television raster without affecting the other corners.

The circuit of FIG. 1 generates a linear approximation to the desired corner correction waveform. However, in other applications, ie, when correcting large errors in the scan raster, it may be desirable to use a parabolic approximation instead with its attendant improvement in accuracy. To this end, FIG. 3 depicts a modification to the circuit of FIG. 1, which provides for the generation of four parabolic approximation waveforms, one for each quadrant of the scan raster. Since the modified circuit of FIG. 3 is identical for the four channels of FIG. 1, only one circuit is shown.

Thus, the clippers 30-36 of FIG. 1 are depicted, coupled to their respective emitter-followers 38-44. In FIG. 3 however, followers 38-44 are coupled to respective de-coupled squaring circuits 72, 74, 76, 78 (ie, follower 38 couples to squaring circuit 72, etc). The squaring circuits generate a half-parabolic quadrant waveform from the half-sawtooth output waveforms provided by the clippers 30-36. The half-parabolic output waveforms are fed to respective inverters 46-52 and potentiometers 54-60 as depicted in FIG. 1, which provide the means for selecting the proportion, positive or negative, of the waveform as required for scan correction.

It may be seen that the circuit of FIG. 3 provides both linear and parabolic approximation output waveforms at given points along the circuit. Thus, the modified corrector circuit of FIG. 3 may be still further modified, as in FIG. 4, to provide simultaneously both the linear and parabolic waveforms, and thus both the corresponding scan error correction capabilities. In FIG. 4 the emitter-followers 38-44 of FIG. 1 are coupled to respective squaring circuits 72-78, and thence to the inverters 46-52 and potentiometers 54-60 as previously described in FIG. 3. In addition, the emitter-followers 38-44 are coupled to respective inverters 80, 82, 84, 86 which, in turn, couple to an additional set of respective potentiometers 90R/B, 92R/B, 94R/B and 96R/B and thence to respective summing resistors 98R, 100R, 102B, 104B, in similar configuration to the potentiometer/resistor circuits in FIG. 1. The four half-parabolic and four half-sawtooth quadrant waveforms are then available at respective output terminals (as at 70) for addition to the basic deflection waveforms, to provide both linear and parabolic independent corner correction to the scan raster.

Various other modifications are comtemplated within the invention combination. For example, an exponential converter may be used in place of the squaring circuits 72-78 to generate the paraboloidal waveform. Further, buffer transistor 12 and vertical integrator 14 may be deleted and the choppers 22, 24 driven by an externally-supplied vertical sawtooth signal of the described characteristic and of suitable accuracy and stability, when such is available.

Further, in a color television camera, additional similar outputs may be provided for the green channel as well, in which case the invention may be used to correct absolute geometry (i.e., all three channels) rather then differential geometry ("red registration", "blue registration"). Alternatively, the third set of outputs may be applied equally to all three channels, and the two sets of outputs herein referred to as "red" and "blue"; respectively, applied each to the indicated channel. This approach is useful when all three channels have similar but relatively large errors.

What is claimed is:

1. A corrector circuit for generating selected correction waveforms for addition to the basic scan deflection waveforms of a television camera tube to correct given geometric scan errors in given portions of the picture raster, comprising the combination of;

means for amplitude modulating a train of horizontal-rate pulses with a vertical-rate sawtooth waveform to provide a vertical sawtooth-modulated horizontal pulse train;

clipper means for selectively clipping the vertical sawtooth-modulated horizontal pulse train to define one output thereof which is zero for the first half of the television field, and another output thereof which is zero for the second half of the field;

integrator means coupled to the clipper means to generate a horizontal-rate sawtooth waveform commensurate with the respective incoming clipped pulse train;

second clipper means coupled to the integrator means for clipping and dividing the respective incoming horizontal-rate sawtooth waveform into half-sawtooth output waveforms; and means coupled to the second clipper means for selecting proportions of the half-sawtooth output waveforms commensurate with the geometric scan errors and the corresponding required to provide selected error correction waveforms in the given portions of the picture scan raster.

2. The circuit of claim 1 wherein the picture scan raster is divided into quadrants and wherein;

the clipper means includes a negative and a positive clipper which generate respective negative and positive outputs;

the integrator means includes a pair of integrators which generate horizontal-rate sawtooth waveforms respectively modulated by the first and second halves of the vertical-rate sawtooth waveform; and the second clipper means generates four half-sawtooth output waveforms corresponding to respective quadrants of the scan raster.

3. The circuit of claim 2 wherein;

the clippers are each formed of a matched pair of transistors coupled to accurately clip the pulse trains at ground.

4. The circuit of claim 3 further including;

means coupled to the clippers for removing any DC component in the respective clipped pulse trains.

5. The circuit of claim 4 further including;

means for generating a parabolic waveform operatively coupled to the second clipper means to generate multiple half-parabolic quadrant waveforms.

6. The circuit of claim 5 wherein the means for generating a parabolic waveform includes a squaring circuit operatively coupled between the second clipper means and the means for selecting proportions.

7. The circuit of claim 4 wherein the means for amplitude modulating includes;

second integrator means for generating a vertical-rate sawtooth waveform; and chopper means for generating the horizontal-rate pulses and coupled at the output thereof to the second integrator means input.

8. The circuit of claim 7 wherein the means for selecting includes;

potentiometer means operatively coupled to the second clipper means and adjustable to select positive and negative proportions of each half-sawtooth output waveform to provide selected error correction waveforms to provide selected error correcting waveforms for each of the quadrants.

9. The circuit of claim 8 further including;

summing resistors coupled to the potentiometer means to sum the multiple half-sawtooth output waveforms into a full composite waveform corresponding to the selected error correction waveforms.

10. The circuit of claim 9 further including;

emitter-follower means coupled to respective second clipper means; and inverter means coupled to respective emitter-follower means and thence to respective potentiometer means.

* * * * *